United States Patent
Kaiser et al.

(10) Patent No.: US 10,287,460 B2
(45) Date of Patent: May 14, 2019

(54) ANTI-CORROSION COMPOSITION

(71) Applicant: DENSO-HOLDING GMBH & CO., Leverkusen (DE)

(72) Inventors: Thomas Markus Kaiser, Inden (DE); Oleg Gryshchuk, Leverkusen (DE)

(73) Assignee: DENSO-HOLDING GMBH & CO., Leverkusen (DE)

( * ) Notice: Subject to any disclaimer, the term of this patent is extended or adjusted under 35 U.S.C. 154(b) by 0 days.

(21) Appl. No.: 15/516,861

(22) PCT Filed: Nov. 16, 2015

(86) PCT No.: PCT/EP2015/076692
§ 371 (c)(1),
(2) Date: Apr. 4, 2017

(87) PCT Pub. No.: WO2016/165791
PCT Pub. Date: Oct. 20, 2016

(65) Prior Publication Data
US 2018/0334595 A1  Nov. 22, 2018

(30) Foreign Application Priority Data
Apr. 15, 2015  (DE) ........................ 10 2015 105 763

(51) Int. Cl.
*C09J 7/00* (2018.01)
*C08L 23/22* (2006.01)
*C09J 7/38* (2018.01)
*C09J 5/00* (2006.01)
*F16L 58/04* (2006.01)
*C09J 123/22* (2006.01)

(52) U.S. Cl.
CPC ............... *C09J 7/383* (2018.01); *C08L 23/22* (2013.01); *C09J 5/00* (2013.01); *C09J 123/22* (2013.01); *F16L 58/04* (2013.01); *C09J 2423/00* (2013.01)

(58) Field of Classification Search
None
See application file for complete search history.

(56) References Cited

U.S. PATENT DOCUMENTS

| 4,426,468 A | 1/1984 | Omum et al. |
| 5,295,525 A | 3/1994 | Sanda, Jr. |
| 5,817,413 A | 10/1998 | Huddleston et al. |
| 7,666,341 B2 | 2/2010 | Pearce |
| 2015/0056442 A1 | 2/2015 | Hayashi |

FOREIGN PATENT DOCUMENTS

| DE | 20119209 U1 | 4/2002 |
| DE | 102011054826 A1 | 6/2012 |
| EP | 0035851 A2 | 9/1981 |
| EP | 0232936 A2 | 8/1987 |
| EP | 0421607 A1 | 1/1991 |
| EP | 2210734 A2 | 7/2010 |
| WO | 98/49249 A1 | 11/1998 |
| WO | 2008056979 A2 | 5/2008 |
| WO | 2014011051 A1 | 1/2014 |

OTHER PUBLICATIONS

Search Report for International Application No. PCT/EP2015/076692, dated Jan. 27, 2016, 4 pp.
Plastics—Resins in the Liquid STate or as Emulsions or Dispersions—Determination of Apparent Viscosity Using a Single Cylinder Type Rotational Viscometer Method, Internatonal Standard ISO 2555, Third Edition, May 2018, Reference No. ISO2555:2018(E), Published in Switzerland, pp. i-iv and 1-2.
Dick, Rubber Technology: Compounding and Testing for Performance, published Jul. 3, 2014, ISBN: 9783446439733, p. 174.

*Primary Examiner* — Barbara J Musser
(74) *Attorney, Agent, or Firm* — Dinsmore & Shohl LLP

(57) ABSTRACT

The invention relates to an anti-corrosion composition comprising at least one first butyl rubber having an apparent viscosity according to Brookfield measured at 66° C. according to DIN EN ISO 2555 in a range of approximately 400,000 mPa·s to approximately 2,000,000 mPa·s and has an average molecular weight in a range of approximately 20,000 to approximately 60,000 and at least one second butyl rubber having an average molecular weight in a region of approximately 150,000 to approximately 2,000,000 and a Mooney viscosity ML (1+8) measured at 125° C. in a range of approximately 25 MU to approximately 65 MU, measured according to ISO 289.

16 Claims, No Drawings

ANTI-CORROSION COMPOSITION

CROSS-REFERENCE TO RELATED APPLICATIONS

This application claims priority to German Patent Application No. 10 2015 105 763.8, filed Apr. 15, 2015, and International Patent Application No. PCT/EP2015/076692, filed Nov. 16, 2015.

TECHNICAL FIELD

The present invention relates to an anti-corrosion composition as well as its use for protection of pipes and units comprising pipes, as well as other units and installations, and a method for obtaining a corrosion protection and an at least single-layered wrapping tape, comprising the composition according to the invention.

BACKGROUND

Numerous anti-corrosion compositions, or anti-corrosion systems for pipe units such as pipelines, for example, but also technical units, etc. are known from the prior art. As such, EP 0 421 607 A1, for example, discloses a tape wrapping system for protecting pipe-shaped objects, which comprises an inner wrapping that covers the object to be protected, and an outer wrapping disposed over the inner wrapping, wherein the inner wrapping comprises an impact resistant layer having an adhesive layer on its inner surface and a layer on its outer surface, and wherein the outer wrapping comprises a carrier layer having a layer on at least one of its surfaces, wherein the inner wrapping and the outer wrapping surround a material that can be melted with heat, wherein the tape wrapping system is applied to the pipe-shaped object such that when heated and cooled, the outer wrapping fuses together with the inner wrapping, thus forming a fully closed, protective coating. The object of producing an improvement in relation to corrosive external forces is to be achieved by means of the tape encasing system disclosed therein in that a continuous, seamless, protective tape coating system is created. One of the adhesive layers can be produced thereby as a butyl rubber, for example. By way of example, ethylene vinyl acetate, ethylene methyl acrylate and low density polyethylene are used as the material that melts when exposed to heat. The problem with the tape coating system disclosed in EP 0 421 607 A1 with coated pipe systems or technical units, regardless of the type, is the contact between the outer surface of a pipeline pipe and the adhesive layer, made of butyl rubber for example, which can separate from the outer surface of the pipeline pipe, specifically at higher temperatures.

There are also problems when the anti-corrosion composition is not used in the form of a tape, but rather in the form of a putty. Here as well, it is frequently the case that at higher temperatures there is an insufficient adhesion of the putty to steel surfaces of any type, for example. The adhesion of putties or tapes is defined, in particular by the peel strength, also referred to as peeling resistance, which can be determined in accordance with DIN EN 12068, for example. However, the aforementioned adhesion is often inadequate not only at high temperatures, but already at room temperatures (20° C. or 23° C.). An improved adhesion is generated through the use of a primer/bonding agent containing a solvent.

SUMMARY

It is therefore the object of the invention to create an anti-corrosion composition that exhibits an improved adhesion to surfaces of any type, e.g. pipes or units comprising pipes, as well as other installations, and which preferably also has an improved mechanical load capacity thereby.

This object is achieved by means of an anti-corrosion composition comprising at least one first butyl rubber having an apparent viscosity according to Brookfield measured at 66° C. in accordance with DIN EN ISO 2555 in the version 2000-01, in a range of approx. 400,000 mPa·s to approx. 2,000,000 mPa·s, preferably approx. 600,000 mPa·s to approx. 1,600,00 mPa·s, and an average molecular weight $M_W$ (also referred to as the average molar mass or molecular mass $M_W$) in a range of approx. 20,000 to approx. 60,000, preferably approx. 32,000 to 48,000, furthermore comprising at least one second butyl rubber having an average molecular weight $M_W$ in a range of approx. 150,000 to approx. 2,000,000, preferably approx. 300,00 to approx. 1,800,000, more preferably in a range of approx. 200,000 to approx. 500,00, and a Mooney viscosity ML (1+8) at 125° C. in a range of approx. 25 MU to approx. 65 MU, preferably 30 MU to 60 MU, more preferably approx. 40 MU to approx. 59 MU, and even more preferably approx. 40 MU to approx. 55 MU, measured in accordance with ISO 289 in the 2005 version or in accordance with ASTM 1604-04.

DETAILED DESCRIPTION

The at least one first butyl rubber is preferably selected from a group comprising depolymerized butyl rubbers. These are obtained through depolymerization of butyl rubbers (IIR). The at least one butyl rubber has a low molecular weight. It is particularly preferably present in liquid form at 23° C. In contrast, the at least one second butyl rubber is not depolymerized, and has a high molecular weight in comparison to the first butyl rubber. The at least one second butyl rubber is preferably present as a solid at 23° C. The DIN EN ISO 2555: 2000-01 "Plastic resin in liquid state, as an emulsion or dispersion" is used to determine the apparent viscosity according to the Brookfield method, in order to determine the viscosity of the at least one first butyl rubber.

As set forth in the present invention, the term butyl rubber is understood in particular to mean co- or block-copolymers of isobutene, having approx. 0.5% by weight to approx. 5.0% by weight isoprene, in relation to the overall quantity of the butyl rubber, which are produced in particular through cationic polymerization. A cross-linking reaction can be initiated via the isoprene and the carbon-carbon double bonds present therein, which act as a functional group, such that as a result, the demands for a sufficiently dense anti-corrosion encasing for pipes or installations, including other units, can be fulfilled. As set forth in the present invention, the term butyl rubber also includes, in particular, halogenated butyl rubbers, in particular those that are chlorinated or brominated (chlorobutyl rubber or bromobutyl rubber, respectively). Mixtures of numerous butyl rubbers can also be used, i.e. more than at least one butyl rubber.

The at least one second butyl rubber is advantageously present in the composition in a quantity in a range of approx. 5% by weight to approx. 50% by weight, more preferably in a quantity in a range of approx. 10% by weight to approx. 40% by weight, even more preferably in a quantity in a range of approx. 15% by weight to approx. 35% by weight, with respect to the overall quantity of the composition in each case. With a higher portion of the second butyl rubber in the composition according to the invention, a higher peeling strength is fundamentally obtained, in a direct relation thereto. This is accompanied, however, with the disadvantage that an adhesive, and thus disadvantageous, peeling image is obtained in a peeling test.

Advantageously, the at least one second butyl rubber has values for the unsaturatedness in a range of approx. 1 mol-% to approx. 3 mol-%, more preferably in a range of approx. 1.3 mol-% to approx. 2.5 mol-%. This means that preferably about 1 mol-% to about 3 mol-%, further preferably about 1.3 mol-% to about 2.5 mol-% of unsaturated bonds, i.e. carbon-carbon double bonds, are present as functional groups in said at least one second butyl rubber. The at least one second butyl rubber is particularly preferably produced through a copolymerization of isobutene and isoprene in methyl chloride serving as the solvent.

The at least one first butyl rubber, preferably depolymerized first butyl rubber, is advantageously present in the composition in a quantity in a range of approx. 20% by weight to approx. 66% by weight, more preferably in a quantity in a range of approx. 25% by weight to approx. 55% by weight, more preferably in a quantity in a range of approx. 28% by weight to approx. 45% by weight, in relation to the overall quantity of the composition according to the invention in each case. The at least one first butyl rubber advantageously exhibits the property that already at low temperatures, in particular at room temperatures of 20° C. or 23° C. for example, or at slightly raised temperatures of, e.g., 40° C. to 50° C., it will participate in a cross-linking reaction due to the unsaturated carbon-carbon double bonds present therein.

The proportion of the at least one first butyl rubber, thus the overall quantity of the first butyl rubber that is used, even if this is a mixture, to the at least one second butyl rubber, i.e. the overall quantity of the second butyl rubber, even if this is a mixture, is preferably in a range of approx. 2.5:1 to approx. 1:2.5, more preferably in a range of approx. 2:1 to approx. 1:2, even more preferably in a range of approx. 2.5:1 to approx. 1.3:1. On one hand, sufficiently acceptable values for the peeling strength, and thus a good adhesion of the anti-corrosion composition according to the invention to, e.g., steel surfaces of pipes, among other objects, are obtained in these ranges, while simultaneously obtaining a good peeling image. In differing from a cohesive separation, an adhesive separation, or an adhesive peeling image, which is obtained between an anti-corrosion composition and the material it covers, e.g. a steel pipe, would be disadvantageous. With a cohesive separation, or a cohesive peeling image, the anti-corrosion composition remains, at least in part, on the covered product, e.g. a steel pipe.

The anti-corrosion composition according to the invention advantageously has no softening agents aside from the at least one first and the at least one second butyl rubbers, in particular no softening agents in the form of a processing oil. The use of such softening agents is unnecessary, because the at least one first butyl rubber is normally available in liquid form, due to its low molecular weight, such that the addition of a softening agent is no longer necessary. Nevertheless, as set forth in the present invention, it may be provided that a softening agent is used, in particular in the form of a processing oil. If this is the case, the anti-corrosion composition may comprise a processing oil as a softening agent, preferably in a quantity in a range of approx. 0.5% by weight to approx. 10% by weight, more preferably in a quantity in a range of approx. 2% by weight to approx. 8% by weight, in relation to the overall quantity of the composition in each case.

The anti-corrosion composition according to the invention has the major advantage that already at room temperatures of e.g. 23° C., it exhibits excellent values for the peeling strength/peeling resistance in accordance with DIN EN 12068 in the version 1999-03, in particular values that are greater than approx. 3 N/cm, more preferably greater than approx. 5 N/cm, even more preferably greater than 10 N/cm, and wherein values of up to approx. 15 N/cm, preferably up to approx. 20 N/cm are obtained. The aforementioned peeling strengths, also referred to as peeling resistance, relate to the mechanical peeling tests according to DIN EN 12 068 in version 1999-03, this being in relation to both the application of the anti-corrosion composition to a factory coating of a pipe, for example, such as a gas line or pipeline, as well as in relation to a pipe surface that is not coated, e.g. a steel pipe.

The anti-corrosion composition according to the invention has significantly improved values for the peeling strength or peeling resistance according to DIN EN 12068 in the version 1999-03, and thus a very good mechanical load capacity in comparison with anti-corrosion compositions known from the prior art. This also applies at higher temperatures. The anti-corrosion composition according to the invention also advantageously has a good adhesion to substrates of any kind, in particular to pipes such as pipelines or units having pipes, regardless of whether they are already provided with a factory coating or they are not provided with such a coating, i.e. having a metal surface in the latter case, in particular having a steel surface to which the anti-corrosion composition is applied. Particularly advantageously, it is possible to apply the anti-corrosion composition according to the invention without a prior application of a primer/bonding agent, by means of which the work and time intensive step of preparation with such a primer is eliminated. Nevertheless, as set forth in the present invention, the use of such a primer is not excluded. Suitable primers are advantageously composed of butyl rubber in a mixture with hydrocarbon resins in benzene serving as the solvent, and can be obtained under the name DENSOLEN primer, from Denso GmbH, Leverkusen, Germany.

The anti-corrosion composition according to the invention preferably also comprises at least a third, in particular cross-linked, butyl rubber, at least one filler, at least one antioxidant, at least one cross-linking agent, at least one elastomer, and/or at least one stabilizer. The specified further components can be added to the composition according to the invention in and of themselves, or in combinations thereof. It is particularly preferred that the anti-corrosion composition according to the invention has at least one filler in addition to the at least one first and at least one second butyl rubbers, and particularly preferably, the anti-corrosion composition according to the invention has precisely one first butyl rubber, precisely one second butyl rubber, and at least one filler.

In addition to the at least one first and the at least one second butyl rubber, the anti-corrosion composition according to the invention more preferably comprises at least one third, in particular cross-linked, more preferably strongly cross-linked, butyl rubber, as well as, even more preferably, at least one filler. More preferably, the anti-corrosion composition according to the invention has precisely one first butyl rubber, precisely one second butyl rubber, at least one filler, more preferably, the anti-corrosion composition according to the invention has precisely one first butyl rubber, precisely one second butyl rubber, precisely one third butyl rubber, and at least one filler. The at least one third butyl rubber preferably exhibits a Mooney viscosity ML (1+3) measured at 127° C., according to ISO 289 in the 2005 version, or according to ASTM 1604-04, in a range of approx. 30 MU to approx. 100 MU, preferably approx. 50

MU to approx. 95 MU, even more preferably in a range of approx. 60 MU to approx. 90 MU, even more preferably in a range of approx. 65 MU to approx. 93 MU, even further preferably in a range of approx. 78 MU to approx. 92 MU, and even more preferably approx. 78 MU to approx. 90 MU. The specific density of the third butyl rubber lies in a range of approx. 0.5 to approx. 1.1, preferably in a range of approx. 0.9 to approx. 0.98 when measured at a temperature of 25° C. according to ASTM D1875 in the 2003 version. The at least one third butyl rubber is preferably selected from a group comprising cross-linked butyl rubbers, including halogenated butyl rubber. The at least one third, in particular cross-linked, butyl rubber is advantageously present in the overall composition in a quantity in a range of approx. 1% by weight to approx. 20% by weight, more preferably in a quantity in a range of approx. 1.5% by weight to approx. 15% by weight, even more preferably in a quantity in a range of approx. 2% by weight to approx. 10% by weight, in relation to the overall quantity of the composition in each case. The specified rubbers and the at least one filler are combined to form a quantity in a range of approx. 90% by weight to approx. 99.5% by weight, preferably approx. 96% by weight to approx. 99.3% by weight of the composition, in each case in relation to the overall quantity of the anti-corrosion composition.

The at least one elastomer comprised in the anti-corrosion composition according to the invention is advantageously selected from a group comprising polyisobutylene having a Staudinger index $J_o$ in a range of approx. 230 cm³/g to approx. 900 cm³/g, preferably in a range of approx. 400 cm³/g to approx. 800 cm³/g, and having an average relative molar mass $\overline{M}_v$ (viscosity agent) in a range of approx. 900,000 g/mol to approx. 5,500,000 g/mol, preferably with an average relative molar mass $\overline{M}_v$ in a range of approx. 2,000,000 g/mole to approx. 5,000,000 g/mol, even more preferably with an average molar mass $\overline{M}_v$ in a range of approx. 3,300,000 g/mol to approx. 4,600,000 g/mol. The Staudinger index $J_o$ was formerly also referred to as the intrinsic viscosity. It is calculated from the flow rate at 20° C. though a capillary of a thaw point viscometer according to the following formula (Schulz-Blaschke equation):

$$J_o = \eta_{sp}/c(1+0.31 \times \eta_{sp}) \text{cm}^3/\text{g}$$

wherein $$\eta_{sp} = \frac{t}{t_0} - 1 \quad \text{(specific viscosity)}$$

wherein t indicates the flow rate of the solution with a Hagenbach-Couette correction, $t_0$ indicates the flow rate of the solvent with the Hagenbach-Couette correction and c indicates the concentration of the solution in g/cm³. The average relative molar mass $\overline{M}_v$ is calculated from the following formula:

$$0.65\sqrt{\frac{J_o \times 10^2}{3.06}}$$

Elastomers in the form of the polyisobutylene defined in this manner can be used with the third, in particular cross-linked, butyl rubber, and in particular can replace it in part. It may also be provided, however, that instead of a third, in particular cross-linked, butyl rubber, at least one polyisobutylene, as defined above, is used in the anti-corrosion composition according to the invention. The at least one elastomer in the form of at least one polyisobutylene is preferably present in the composition in a quantity in a range of approx. 1% by weight to approx. 15% by weight, more preferably in a quantity in a range of approx. 2% by weight to approx. 10% by weight, in relation to the overall quantity of the composition in each case. It can also be provided that mixtures of different polyisobutylenes having the properties specified above are also used.

It is preferred that at least one filler is present in the composition in a quantity in a range of approx. 10% by weight, preferably in a range of approx. 20% by weight to approx. 70% by weight, more preferably in a range of approx. 20% by weight to approx. 56% by weight, even more preferably in a range of approx. 25% by weight to approx. 55% by weight, each in relation to the overall quantity of the anti-corrosion composition according to the invention. It is particularly preferred that the at least one filler is in a powdered or fibrous form. The composition particularly preferably comprises at least one first powdered filler and at least one second fibrous filler. It is particularly preferred, with such a combined addition of at least one powdered and at least one fibrous filler, that a very low quantity of the fibrous filler is added to the anti-corrosion composition in comparison with the powdered filler, preferably in a quantity in a range of approx. 0.1% by weight to approx. 1% by weight, in relation to the overall quantity of the anti-corrosion composition according to the invention.

It is preferred that the at least one filler is selected from a group of the powdered mineral fillers or the mineral and/or organic fibrous fillers, e.g. talcum, zinc oxide, wollastonite having a needle structure, cellulose fibers, etc. It can be selected from a group of organic fibers such as acrylonitrile fibers having a length in a range of approx. 1.5 mm to approx. 20 mm, more preferably having a length in a range of approx. 4 mm to approx. 15 mm, and a fineness in a range of approx. 0.5 dtex to approx. 100 dtex, more preferably having a fineness in a range of approx. 1 dtex to approx. 20 dtex, measured in each case according to ISO 1144 in the 1973 version. If a powdered filler is used, in particular a mineral powdered filler, it advantageously has a residue percentage in a sieve analysis according to DIN 66165 in the 1987-04 version, at H-100 (100 µm) of approx. 1% to approx. 5%, at H-60 (60 µm) of approx. 1% to approx. 5%, and at H-30 (30 µm) in a range of approx. 1% to approx. 5%. Advantageously, the anti-corrosion composition according to the invention has at least one filler.

If at least one antioxidant is provided, it can preferably be present in the anti-corrosion composition in a mixture of different antioxidants, in a quantity in a range of approx. 0.1% by weight to approx. 1% by weight, more preferably in a quantity in a range of approx. 0.2% by weight to approx. 0.5% by weight, in relation to the overall quantity of the anti-corrosion composition according to the invention. If at least one stabilizer, which can also be referred to as a dispersion agent, is present in the anti-corrosion composition according to the invention, it is advantageously selected from a group comprising $C_{10}$ to $C_{24}$ carboxylic acids, and is advantageously stearic acid. The at least one stabilizer/dispersion agent is preferably present in the anti-corrosion composition to the invention in a quantity in a range of approx. 0.05% by weight to approx. 0.5% by weight, in relation to the overall quantity thereof. Metal salts of the specified carboxylic acids such as zinc stearate can also be used as stabilizers/dispersion agents in the aforementioned % by weight ranges for example.

Furthermore the composition according to the invention can have other additives that are typical or necessary, depending on the intended use. In particular, the anti-corrosion composition according to the invention can furthermore have at least one flame retardant, at least one cross-linking agent and/or at least one further elastomer in addition to those above. If a flame retardant is provided, it is present therein in a quantity in a range of approx. 0.02% by weight to approx. 2% by weight in relation to the overall quantity of the anti-corrosion composition according to the invention.

If the anti-corrosion composition according to the invention has at least one cross-linking agent, it is preferably present therein in a quantity in a range of approx. 0.1% by weight to approx. 10% by weight, more preferably in a quantity in a range of approx. 0.2% by weight to approx. 8% by weight, in relation to the overall quantity of the anti-corrosion composition according to the invention. The cross-linking agent is then provided in particular when the anti-corrosion composition according to the invention is a component of a single or multi-layered tape, in particular a wrapping tape for pipes of any type, in particular pipelines. It can also be present, however, when the anti-corrosion composition according to the invention is in the form of a paint-on coating or a putty. The at least one cross-linking agent is advantageously selected from a group comprising at least one phenolic resin. Phenolic resins are cured to form thermosets, the so-called phenoplastics via cross-linking reactions. A cross-linking reaction of this type can occur in the anti-corrosion composition according to the invention. Phenolic resins are condensation products of phenol with aldehydes, preferably formaldehyde. As set forth in the present invention, it is particularly preferred that the anti-corrosion composition according to the invention comprises at least one phenolic resin, which includes hydroxymethyl groups. These hydroxymethyl groups represent the reactive or functional groups, via which a cross-linking reaction occurs, which can also be referred to as a self-curing reaction, with the functional groups, i.e. the carbon-carbon double bonds, the at least one first and/or at least one second butyl rubber, or, instead, the other added elastomer or cross-linked butyl rubber. It is particularly preferred, as set forth in the present invention, that at least one phenolic resin is produced from at least one phenol or its derivatives and at least one aldehyde, selected from a group comprising formaldehyde, acetaldehyde, benzaldehyde and/or acrolein, wherein it is particularly preferred that formaldehyde is used. In particular, tetra-butylphenol, nonylphenol, or octylphenol are used as phenol derivatives, wherein, however, aryl derivatives, in particular phenylphenol, as well as bivalent phenols like resorcinol, bisphenol A, or naphthol, can also be used. Octylphenol formaldehyde resins are particularly preferred. Phenol resins acting as cross-linking agents are in particular those that are included in the class of so-called resols, i.e. produced through a reaction of the specified output products catalyzed with an alkali.

In the overlapping regions of a wrapping of a tape having at least two layers, which has at least one layer of the anti-corrosion composition according to the invention as an outer layer, the at least one layer of the anti-corrosion composition according to the invention is in contact with the other layer. This further layer, e.g. an adhesive layer, can advantageously contain catalysts that accelerate the cross-linking reaction, in particular at low temperatures, e.g. a room temperature of 23° C. Suitable catalysts are selected from a group comprising at least zinc chloride, zinc bromide, iron chloride, antimony chloride, antimony bromide, tin bromide, germanium chloride, cobalt bromide, nickel chloride and/or organic salts of tin or zinc, such as zinc stearates or zinc oleates, wherein it is particularly preferred that tin or zinc halides, and more preferably tin chloride and zinc chloride, are used, alone or in a mixture. The catalyst is contained in this further layer of a tape, which preferably does not contain the anti-corrosion composition according to the invention, advantageously in a quantity in a range of approx. 0.1% by weight to approx. 5% by weight, more preferably in a quantity in a range of approx. 0.15% by weight to approx. 4.5% by weight, and even more preferably in a quantity in a range of approx. 0.2% by weight to approx. 4% by weight, in relation to the overall quantity of this further layer.

If a catalyst is provided, at least one co-reagent can preferably be provided in the material comprising it, selected from a group comprising divinyl fumarate, divinyl adipate, and triallyl trichlorobenzene, wherein it is particularly preferred that a triallyl-trichlorobenzene is selected. The co-reagent serves in particular to make the catalyst that is used compatible in the material in which the catalyst is contained. The co-reagent is advantageously contained in the material in which the catalyst is contained in a quantity in a range of approx. 0.5% by weight to approx. 5% by weight, more preferably in a quantity in a range of approx. 2% by weight to approx. 4.5% by weight, in relation to the overall quantity of the material containing the catalyst.

The at least one further elastomer is advantageously selected from a group comprising at least one ethylene-propylene-diene rubber. These are understood to be such co- or block-copolymers as well as terpolymers, which, as functional groups, have a carbon-carbon double bond. Mixtures thereof can also be used. Terpolymers, which are obtained from a polymerization reaction with ethylene, propylene, and a diene, are particularly preferred thereby. These are also referred to as EPDM terpolymers, and unite a saturated polymer spine with unsaturated residues in side groups. As set forth in the present invention, 5-ethylide-2-norborne, dicyclopentadiene and/or 5-vinylide-2-norborne are particularly preferably used as a diene, this being in quantities of up to approx. 15% by weight, preferably in quantities in a range of approx. 0.3% by weight to approx. 12% by weight. When 5-ethylide-2-norborne is used, quantities in a range of approx. 4% by weight to approx. 11% by weight are used, and when dicyclopentadiene is used, quantities in a range of approx. 1.0% by weight to approx. 6.0% by weight are used. The percentages given above are in relation to the overall quantity of the monomers, which are used in a polymerization to form an EPDM, or ethylene-propylene rubber, respectively.

The anti-corrosion composition according to the invention can furthermore include at least one tackifier, in particular a hydrocarbon resin, in a quantity in a range of approx. 5% by weight to approx. 25% by weight, more preferably in a quantity in a range of approx. 8% by weight to approx. 20% by weight, in relation to the overall quantity of the anti-corrosion composition according to the invention in each case.

It is particularly preferred that the anti-corrosion composition according to the invention comprises at least a first depolymerized butyl rubber in liquid form at 23° C. in a quantity in a range of approx. 22% by weight to approx. 50% by weight, at least one second butyl rubber, which is preferably present as a solid at 23° C., in a quantity in a range of approx. 4% by weight to approx. 30% by weight, at least one third cross-linked butyl rubber, which is preferably a solid at 23° C., in a quantity in a range of approx.

1% by weight to approx. 10% by weight, at least one antioxidant in a quantity in a range of approx. 0.2% by weight to approx. 0.6% by weight, at least one filler, preferably a powdered mineral filler or a fibrous organic filler, or a combination thereof, in a quantity in a range of approx. 10% by weight to approx. 50% by weight, as well as, optionally, at least one stabilizer/dispersion agent in a quantity in a range of approx. 0.1% by weight to approx. 0.5% by weight. The percentages given above are in relation to the overall quantity of the specified anti-corrosion composition according to the invention in each case.

It is particularly preferred that the anti-corrosion composition according to the invention comprises at least one first depolymerized butyl rubber in liquid form at 23° C. in a quantity in a range of approx. 22% by weight to approx. 50% by weight, at least one second butyl rubber, which is preferably a solid at 23° C., in a quantity in a range of approx. 4% by weight to approx. 30% by weight, at least one elastomer in the form of a polyisobutylene, having a relative molar mass $\overline{M}_v$ in a range of approx. 3,000,000 g/mol to approx. 5,000,000 g/mol, in a quantity in a range of approx. 2% by weight to approx. 10% by weight, at least one antioxidant in a quantity in a range of approx. 1% by weight to approx. 0.5% by weight, at least one filler, preferably a powdered mineral filler and/or a fibrous or needle-shaped organic or mineral filler in a quantity in a range of approx. 15% by weight to approx. 45% by weight, as well as, optionally, at least one stabilizer/dispersion agent in a quantity in a range of approx. 0.05% by weight to approx. 0.5% by weight. The percentages given above are in relation to the overall quantity of the specified anti-corrosion compound according to the invention in each case.

Where the term "approx." is used in the present invention with respect to values, value ranges or terms referring to values, it is to be understood herein to mean that which the person skilled in the art would regard as typical in the given context, from the perspective of a person skilled in the art. In particular, deviations of the given values, value ranges or terms referring to values comprised by the term "approx." amount to ±10%, preferably ±5%.

The anti-corrosion composition according to the invention is particularly preferably present in the form of a tape. The tape is particularly preferably structured as a single layer, is more preferably structured as a double layer, but can also have a triple, quadruple, quintuple, etc. layered design. Thus, it can be structured such that it has two outer layers comprising the anti-corrosion composition according to the invention, which encompass an inner layer formed by a carrier film, in particular produced from at least one polyethylene and/or polypropylene, preferably a polyethylene. The carrier film, which can also function as a stretching prevention agent, depending on its thickness, can have an adhesive layer on one or both sides of thereof, facing the layers made of the anti-corrosion composition according to the invention.

It can also be provided that the tape has only one single layer made of the anti-corrosion composition according to the invention, which is bonded to a carrier film, in particular such as that defined above, wherein the carrier film can have an adhesive layer on one or both sides. With such a structure, the carrier film, which then serves primarily as a stabilizer for the layer made of the anti-corrosion composition according to the invention, exhibits a certain thickness, preferably in a range of approx. 0.2 mm to approx. 1.2 mm, more preferably approx. 0.3 mm to approx. 0.7 mm. It is further preferred that the carrier film has adhesive layers having identical or different compositions on its two outer surfaces.

Thus, the carrier film can preferably have an adhesive layer on its side facing the layer formed by the anti-corrosion composition according to the invention, which is formed by the same substance as the carrier film and the at least one first and/or at least one second butyl rubber of the layer made of the anti-corrosion composition according to the invention, preferably made exclusively of the aforementioned substances. The further adhesive layer, which is applied to the side of the carrier film facing away from the layer made of the anti-corrosion composition according to the invention, can, on the contrary, in particular if a second tape having at least one layer is provided, which can be wrapped around the tape having the anti-corrosion composition according to the invention as a tape providing a mechanical protection, in addition to at least one first and/or at least one second butyl rubber in accordance with the composition according to the invention and the material of the carrier film, in particular a polyethylene and/or polypropylene, also include tackifiers, in particular in the form of hydrocarbon resins, as well as antioxidants and, in particular, the catalysts and/or co-reagents for them as specified above. The catalyst and/or co-reagent can initiate the cross-linking reaction, in particular at high temperatures, in particular above approx. 50° C., preferably in a range of approx. 55° C. to approx. 220° C., more preferably in a range of approx. 60° C. to approx. 140° C., in the at least one first and/or the at least one second butyl rubber, and if applicable, also the additionally present elastomer and/or cross-linked butyl rubber, as described above. The catalyst, individually or in a mixture, is comprised in the outer adhesive layer, preferably in a quantity in a range of approx. 0.1% by weight to approx. 10% by weight, preferably in a range of approx. 0.15% by weight to approx. 4% by weight, in relation to the overall quantity of the outer adhesive layer in each case. When the tape, having at least one layer made of the anti-corrosion composition according to the invention, is wrapped on or applied to pipe-shaped or other objects with overlapping, then a cross-linking can be initiated in the overlapping region, preferably at increased temperatures, when at least one catalyst is provided in the outer adhesive layer, such that a stable adhesion, in particular without wrinkles, can be obtained in the overlapping region.

The tape having the anti-corrosion composition according to the invention can have, in particular, a symmetrical or asymmetrical structure. A symmetrical tape has, as already described above, a carrier film, composed, for example, of at least one polyethylene and/or polypropylene, which is encompassed on both outer surfaces by a layer that is formed by the anti-corrosion composition according to the invention. Both outer layers are preferably the same thickness thereby. At least one adhesive layer may be provided between the carrier film and the layers having the anti-corrosion composition, as described above. If adhesive layers are disposed on both sides of the carrier film, they likewise exhibit the same thickness. This is then what is referred to as a symmetrical 3 or 5 layered tape, the adhesive layers being included in the latter case.

It may be the intention to make an asymmetric tape available. This can be structured, for example, such that one layer, formed by the anti-corrosion composition according to the invention, and which faces the product that is to be covered, is bonded to a carrier film, as defined above. At least one adhesive layer can be disposed thereby between the layer having the anti-corrosion composition according to the invention and the carrier film. Another layer made of the anti-corrosion composition according to the invention can be provided on the side of the carrier film facing away from the layer made of the anti-corrosion composition according to the invention, which is not as thick as the layer facing the product that is to be encased. The carrier film can also have a further adhesive layer on the side facing away from the layer made of the anti-corrosion composition according to the invention, which preferably likewise comprises at least one first and/or at least one second butyl rubber as well as the material of the carrier film, and furthermore preferably comprises additional tackifiers, such as hydrocarbon resins, catalysts, co-reagents, and other additives, as described above.

As set forth in the present invention, it can also be provided that the tape having a layer made of the anti-corrosion composition according to the invention comprises at least one layer of a stretching prevention agent. The tape can be designed thereby, such that it is composed of a single layer made of the anti-corrosion composition according to the invention, wherein a very thin intermediate layer is formed, approximately in the middle, preferably having a thickness in a range of approx. 15 µm to approx. 100 µm, more preferably in a range of approx. 20 µm to approx. 75 µm. This intermediate layer serves as a stretching prevention agent, and prevents an overexpansion of the tape, in particular in the case of a spiral wrapping thereof about a product that is to be wrapped, e.g. a pipeline. The stretching prevention agent, or intermediate layer, respectively, is particularly preferably formed by at least one polyethylene and/or polypropylene, and is particularly preferably a polyethylene film, in particular from an LDPE or LLDPE. Such a layer, provided with a stretching prevention agent, made of the anti-corrosion composition according to the invention, can also be referred to as having two or, alternatively, three layers. The stretching prevention agent can be disposed in the tape symmetrically, approximately in the middle, or asymmetrically, displaced toward the upper surface or lower surface thereof. It is preferred, however, that it is disposed symmetrically, approximately in the middle, i.e. at one half the thickness of the tape, as long as this otherwise comprises only one layer that is formed by the anti-corrosion composition according to the invention. It can however also be provided, as described above, that a further layer is disposed above the stretching prevention agent on that side of the tape that faces away from the product that is to be covered, which has, for example, a catalyst, e.g. an adhesive layer. In this case, an actual three-layered tape is obtained.

The adhesive layers referred to above preferably have the at least one second and/or at least one third butyl rubber, alternatively or at least partially replacing it or them, one polyisobutylene as defined above, of the anti-corrosion composition according to the invention, and at least one polyethylene and/or polypropylene. They particularly preferably have at least one second or at least one third butyl rubber, or the aforementioned polyisobutylene, preferably at least one second butyl rubber, even more preferably precisely one second butyl rubber, or a mixture of a second and third butyl rubber, or alternatively, a mixture of a second butyl rubber and at least one polyisobutylene, wherein the quantity of the at least one second and/or third butyl rubber or polyisobutylene that is used is in a range of approx. 35% by weight to approx. 65% by weight, more preferably in a range of approx. 40% by weight to approx. 60% by weight, in relation to the overall quantity of the adhesive layer in each case. The at least one polyethylene and/or polypropylene, preferably at least one polyethylene, in particular an LPDE or LLDPE, more preferably precisely one polyethylene, is present in the adhesive layer in a quantity in a range of approx. 25% by weight to approx. 65% by weight, more preferably in a quantity in a range of approx. 30% by weight to approx. 60% by weight, in relation to the overall quantity of the adhesive layer in each case. A composition of an adhesive layer comprises only the at least one second and/or at least one third butyl rubber and the at least one polyethylene and/or polypropylene thereby, preferably precisely one second butyl rubber and precisely one polyethylene, and no other additives.

A further composition of an adhesive layer comprises further additives in addition to the at least one second and/or at least one third butyl rubber, or at least one polyisobutylene and the at least one polyethylene and/or polypropylene, respectively, these being, preferably, tackifiers, antioxidants, catalysts, co-reagents, as describe above in particular, as well as pigments. A tackifier can be present thereby, for example, in a quantity in a range of approx. 5% by weight to approx. 15% by weight, more preferably in a quantity in a range of approx. 7% by weight to approx. 13% by weight, and is preferably selected from a group comprising hydrocarbon resins. Furthermore, at least one antioxidant can be provided, preferably in a quantity in a range of approx. 0.05% by weight to approx. 0.5% by weight, more preferably in a quantity of approx. 0.1% by weight to approx. 0.5% by weight. The antioxidant can be selected thereby, in particular from a group comprising sterically impaired phenols, such as pentaerythritol-tetrakis (3-(3,5-di-ter-butyl-4-hydroxiphenyl)propionate). In addition, the adhesive layer can also include at least one pigment, in particular that is present in the form of a master batch. The at least one pigment is present in a composition of the adhesive layer in a quantity in a range of approx. 0.5% by weight to approx. 3% by weight, more preferably in a quantity in a range of approx. 0.9% by weight to approx. 2% by weight. The aforementioned percentages by weight relating to the tackifier, the antioxidant and the pigment are in relation to the overall quantity of the adhesive layer in each case. The pigment can be a black pigment, for example, in order to give the tape a uniform overall appearance. However, in order to emphasize and highlight the presence of an adhesive layer, some other pigment can be used, e.g. having a red color. The adhesive layer preferably has a thickness in a range of approx. 10 µm to approx. 150 µm, more preferably a thickness in a range of approx. 20 µm to approx. 100 µm, even more preferably a thickness in a range of approx. 25 µm to approx. 80 µm.

The carrier film, if it is not designed as a stretching prevention agent, advantageously exhibits a thickness in a range of approx. 0.2 mm to approx. 1.2 mm, more preferably a thickness in a range of approx. 0.3 mm to approx. 0.8 mm. The carrier film is advantageously composed of polyethylene or polypropylene, and is preferably composed of a polyethylene. The carrier film is particularly preferably formed from a group comprising polyethylenes that can be electron-beam cross-linked. If the carrier film is used with adhesive layers, then a polyethylene is likewise used in the adhesive layers, which can be electron-beam cross-linked, preferably the same polyethylene that is also present in the carrier film. More advantageously, the carrier film is subjected to a light tension, such that advantageously, a tendency to shrink exists when it is heated, and a possible stretching when heated can be compensated for. In addition, the pressure applied to the pipe-shaped object is increased when used in the form of a wrapping for pipe-shaped objects.

If the carrier film has an adhesive layer on both sides, the entire composite is preferably subjected to a light tension. A film composite produced in this manner is then subsequently coated with the anti-corrosion composition according to the invention on at least one side. This layer preferably has a thickness in a range of approx. 0.25 mm to approx. 2.0 mm, more preferably a thickness in a range of approx. 0.35 mm to approx. 1.3 mm. If the carrier film is provided with an adhesive layer on both sides, and the carrier film is only coated on one side with the anti-corrosion composition according to the invention, the outer adhesive layer advantageously has catalysts, and optionally, co-reagents therefor as well, as described above. The composition of the adhesive layers disposed on both sides of the carrier film can thus be, particularly preferably, different, as set forth in the present invention. The tape structure described above has the advantage that, on one hand, a cross-linking reaction is likewise initiated in the overlapping region by means of the catalyst that has been provided, when such a tape is wrapped or applied, and furthermore, regardless of whether it is applied with an overlapping or not, the tape can be wrapped with another identical tape, for example, wherein then, the at least one catalyst present in the outer adhesive layer initiates the cross-linking of the part of the other tape having the anti-corrosion composition according to the invention facing toward it. The carrier film can comprise other additives thereby, e.g. pigments, antioxidants, or stabilizers/dispersion agents. In another design of the present invention, the anti-corrosion composition according to the invention can also be applied to one side of a shrink-sleeve or a shrink-tape. In addition to providing a good adhesion through cross-linking due to the specific composition of the anti-corrosion composition according to the invention, a further thermal activation of the anti-corrosion composition according to the invention can occur due to the heating of the shrink-sleeve or shrink-tape necessary for the shrinkage, such that the cross-linking reaction is promoted, thus enabling a stronger adhesion of such a system to a pipe-shaped object in particular.

In addition to the at least one-layered tape described above, having the anti-corrosion compound according to the invention, a second tape may be provided to create a mechanical protection. The second tape has at least one layer, and preferably has at least one, two or three layers. Four or more layers are also possible. The second tape is to be regarded as a mechanical protective tape. The second tape preferably comprises one layer made of at least one polyethylene and/or polypropylene, preferably at least one polyethylene, preferably an electron-beam cross-linkable polyethylene, having a sufficient thickness. If polyethylene is used, this has an elongation at the breaking point, according to EN ISO 527 in the 2012-06 version, of >300%, more preferably >400%, even more preferably >500%, preferably such in a range of approx. 300% to approx. 800%. More preferably, it has a tensile stress according to EN ISO 527 in the 2012-06 version in a range of approx. 8 to approx. 25 MPa, more preferably in a range of approx. 12 to approx. 20 MPa. The second tape can also be used, for example, to wrap two identical tapes having the anti-corrosion composition according to the invention around a pipe-shaped object. The identity of the tapes specified above, having the anti-corrosion composition according to the invention, advantageously consists of an identical structure and/or identical chemical composition.

The at least one layer made of polyethylene and/or polypropylene, preferably precisely one layer, of the second tape can be provided with an adhesive layer on one side. It can also be provided, however, that it is provided on one side with an adhesive layer made of at least one first and/or at least one second butyl rubber in accordance with the anti-corrosion composition according to the invention. This layer can comprise, in addition to the at least one first and/or at least one second butyl rubber, other additives such as antioxidants, hydrocarbon resins as tackifiers, processing oils as softeners, pigments, etc. If an adhesive layer is bonded to the layer made of at least one polyethylene and/or polypropylene, as described above, it is preferably provided thereby for the second tape, that a layer for obtaining a sufficient adhesion is provided between these two layers, wherein it can have a composition like that described above in conjunction with the tape having the anti-corrosion composition according to the invention.

Furthermore, a pipe-protection mat may be provided, which is disposed around the at least one tape having at least one layer made of the anti-corrosion composition according to the invention, or, optionally, also in combination with a second tape, which serves as a cover or protection tape, by means of which an advantageous, in particular load distributing effect to the encasing comprising the at least second tape, lying under the pipe-protection mat, is obtained.

Any product that can corrode can be protected with the anti-corrosion composition according to the invention, in particular through covering thereof when present in a tape or mat (film) form, or if the putty is painted or spread on in order to form a coating. The anti-corrosion composition is particularly preferably used for pipes and units having pipes. In particular, the anti-corrosion composition according to the invention is used to encase pipelines of any type, as well as to encase gas lines etc. It can also be used for other technical facilities and/or in areas in which corrosion can occur, and thus not only in the form of a wrapping, but also, e.g. in the form of an application/cover, when designed as a tape having at least one layer, or a mat having at least one layer, but also in the form of a coating made of a putty that can be painted or spread on, comprising the anti-corrosion composition according to the invention.

The present invention furthermore relates to the use of the anti-corrosion composition according to the invention, as described below, for protection of pipes and units comprising pipes, as well as other units and installations against corrosion. Furthermore, the present invention also relates to a method for obtaining corrosion protection on pipes and units comprising pipes, as well as other units and installations, through the application of the anti-corrosion composition according to the invention. It is particularly preferred that with the method according to the invention, at least on single-layered tape, comprising the anti-corrosion composition according to the invention is wrapped around pipes or units comprising pipes. Lastly, the present invention relates to a wrapping tape having at least one layer, comprising the anti-corrosion composition according to the invention, as described above.

The present invention shall be explained in greater detail, based on the following examples. It should be noted at this point that the features specified in the examples are such that they can be combined with all of features described in the general description, individually or in combinations thereof. In particular, the composition of the anti-corrosion composition according to the invention in the form of a tape is merely exemplary.

On the whole, five comparison compositions 1 to 5 and ten anti-corrosion compositions according to the invention 6 to 16 were produced, wherein the precise compositions thereof can be derived from the following table, in which the peeling strengths/peeling resistances are listed, determined according to DIN EN 12068 in the 1999-03 version.

|  | composition no. | | | | | | | | | | | | | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 | 16 |
| liquid polyisobutylene | 20 | 26.1 | 19 | 19 | 20 | | | | | | | | | | | |
| depolymerized (first) butyl rubber | | | | | | 45 | 44.7 | 43.3 | 40.1 | 28.5 | 39.7 | 36.1 | 38.1 | 39.6 | 39.1 | 40 |
| solid (second) butyl rubber | 10 | 17.4 | 9.5 | 10 | 10 | 5 | 5 | 8 | 14.8 | 28.5 | 20 | 27.2 | 26.3 | 22.6 | 22.3 | 20 |
| softener | 10 | 13 | 14.5 | 14 | 10 | | | | | | | | | | | |
| powdered, mineral filler | 60 | 34.8 | 57 | 57 | 60 | 50 | 49.6 | 48 | 44.5 | 42.4 | 39.7 | 36.1 | 35.1 | 34 | 33.4 | 18.7 |
| tackifier | | 8.7 | | | | | | | | | | | | | | |
| fibrous organic filler | | | | | | | 0.3 | 0.3 | | | | | | | | |
| fibrous mineral filler | | | | | | | | | | | | | | | | 16 |
| antioxidant | | | | | | | 0.4 | 0.4 | 0.4 | 0.4 | 0.4 | 0.4 | 0.3 | 0.28 | 0.28 | 0.2 |
| stabilizer | | | | | | | | | 0.2 | 0.2 | 0.2 | 0.2 | 0.2 | 0.12 | 0.12 | 0.1 |
| third cross-linked butyl rubber | | | | | | | | | | | | | | 2.8 | 4.2 | |
| polyisobutylene | | | | | | | | | | | | | | | | 5 |
| cross-linking agent | | | | | | | | | | | | 0.6 | 0.6 | | | |
| peeling strength/peeling resistance [N/cm] | 3.4 | 3.1 | 2.1 | 2.6 | 3.5 | 4.1 | 4.1 | 4.3 | 5.6 | 8.9 | 6.9 | 6.2 | 9.1 | 11.0 | 12.0 | 10.4 |

In the comparison compositions 1 to 5, a processing oil is used as the softener. Liquid polyisobutylene and softeners are used in the comparison compositions 1 to 5 in order to obtain, approximately, a similar composition with regard to viscosity, etc., as that with the compositions according to the invention 6 to 16, which contain a first depolymerized rubber. The depolymerized (first) butyl rubber that is used has an apparent Brookfield viscosity of 1,300,000 at 66° C., and an average molecular weight of 42,000, or an apparent Brookfield viscosity of 800,000 at 66° C., and an average molecular weight of 36,000. A butyl rubber having a Mooney viscosity ML (1+8) at 125° C. of 51±5 MU according to ISO 289 in the 2000-01 version, and an unsaturatedness of 1.85±0.2 mol-% is used as the second, solid butyl rubber, and a cross-linked butyl rubber having a Mooney viscosity ML (1+3) at 127° C. of 80-90 MU is used as the third butyl rubber. A polyisobutylene having an average relative molar mass $\overline{M}_v$ of approx. 4,000,000 g/mol (viscosity agent) is used as the polyisobutylene. A talcum is used as the mineral powdered filler, which represents a natural mixture of magnesium silicate hydrate and magnesium aluminum silicate hydrate having a pronounced leaf structure. An acrylonitrile fiber having a fineness of 1.5 dtex and a length of 12 mm is used as the fibrous organic filler, and a wollastonite having a needle structure is used as the fibrous mineral filler. Otherwise, typical antioxidants are used, and stearic acid is used as the stabilizer. A phenol resin is used as the cross-linking agent. All of the information in the above table is provided in terms of percentages by weight, wherein the percentages by weight relate in each case to the overall quantity of the respective anti-corrosion compositions.

The anti-corrosion compositions 1 to 16 according to the above table have been produced in the form of a three-layered tape having one layer made of the specified compositions on a carrier film of polyethylene, which has an adhesive layer on the side facing the composition, having a thickness totaling to ca. 1 mm. A steel pipe is then wrapped therewith, at a room temperature of 23° C., in a single layer, and without overlapping. The values given in the above table were obtained in the determination of the peeling strength/peeling resistance thereby. It is clear therein that the compositions according to the invention 6 to 16 have significantly higher values for the peeling strength/peeling resistance than the compositions according to the comparison compositions 1 to 5. In particular, very good, cohesive peeling images were obtained with the compositions 11 to 16, with a very good cross-linking to the steel on both sides, with the composition 10, a cohesive peeling image was obtained, but with a very quick removal, a rather adhesive peeling image was obtained. Cohesive peeling images were also obtained with the compositions 6 to 9.

The tests show that advantageous values with respect to peeling strength/peeling resistance, determined according to DIN EN 12068 in the 1999-03 version, could be obtained with the anti-corrosion composition according to the invention, and generally excellent cohesive peeling images as well, combined with a good cross-linking to the substrate, a steel pipe in this case. No preparation agent, or primer was used. These were, however, necessary with the comparison compositions, in order to comply with the standards according to DIN EN 12068 in the 1999-03 version. In particular, the compositions 14 to 16 exceed the standards required in DIN EN 12068 in the 1999-03 version with regard to the peeling resistance/peeling strength.

An anti-corrosion composition is provided with the present invention, which can be used in both a spreadable form as well as in the form of a tape or shrink sleeve, regardless of the design, and exhibits very good adhesive properties, creating a long term corrosion protection for the products, units, installations, pipes, pipelines, etc. provided therewith. Advantageously, it can be used without a primer/adhesive, regardless of the form.

The invention claimed is:

1. An anti-corrosion composition comprising:
   at least one first butyl rubber having an apparent viscosity according to Brookfield at 66° C. according to DIN EN ISO 2555 in a range of approx. 400,000 mPa·s to approx. 2,000,000 mPa·s and an average molecular weight in a range of approx. 20,000 to approx. 60,000 and at least one second butyl rubber having an average molecular weight in a range of approx. 150,000 to approx. 2,000,000 and a Mooney viscosity ML (1+8) at 125° C. in a range of approx. 25 MU to approx. 65 MU, measured according to ISO 289.

2. The composition according to claim 1, wherein the at least one first butyl rubber is present in the composition in a quantity in a range of approx. 20% by weight to approx. 66% by weight, in relation to an overall quantity of the composition.

3. The composition according to claim 1, wherein the at least one second butyl rubber is present in the composition in a quantity in a range of approx. 5% by weight to approx. 50% by weight, in relation to an overall quantity of the composition.

4. The composition according to claim 1, wherein the at least one first butyl rubber is selected from a group comprising depolymerized butyl rubbers.

5. The composition according to claim 1, wherein the at least one second butyl rubber has values for the unsaturatedness in a range of approx. 1 mol-% to approx. 3 mol-%.

6. The composition according to claim 1, wherein the at least one second butyl rubber is formed of produced through a copolymerization of isobutylene and isoprene in methyl chloride serving as a solvent.

7. The composition according to claim 1, further comprising at least one third, in particular cross-linked butyl rubber, or at least one filler, or at least one antioxidant, or at least one cross-linking agent, or at least one elastomer, and/or or at least one stabilizer and combinations thereof.

8. The composition according to claim 7, wherein the at least one filler is present in the composition in a quantity in a range of approx. 20% by weight to approx. 70% by weight, in relation to an overall quantity of the composition.

9. The composition according to one of the claim 7, wherein the at least one filler is powdered or fibrous.

10. The composition according to claim 7, wherein the composition comprises a first powdered filler and a second fibrous filler.

11. The composition according to claim 7, wherein the at least one elastomer is selected from a group comprising polyisobutylene having a Staudinger index $J_o$ in a range of approx. 230 cm$^3$/g to approx. 900 cm$^3$/g, and having an average molar mass (viscosity agent) in a range of approx. 900,000 g/mol to approx. 5,500,000 g/mol.

12. The composition according to claim 1, wherein the composition is present in the form of a tape or a mat.

13. The composition according to claim 12, wherein the tape has a two-layered or multi-layered structure, wherein at least one layer comprises the composition.

14. A method for obtaining a corrosion protection on pipes and units comprising pipes, as well as other units and installations comprising the steps of:
   applying the composition of claim 1 to a structure to be protected.

15. The method according to claim 14, wherein the step of applying the composition includes wrapping the structure to be protected with an at least one layered tape.

16. An at least single-layered wrapping tape, comprising the composition according to claim 1.

* * * * *